United States Patent [19]

Brogårdh et al.

[11] Patent Number: 4,562,348
[45] Date of Patent: Dec. 31, 1985

[54] FIBER OPTICAL LUMINESCENCE MEASURING SYSTEM FOR MEASURING PHYSICAL QUANTITIES WITH TIME- OR FREQUENCY-DIVIDED SIGNAL INFORMATION

[75] Inventors: Torgny Brogårdh; Bertil Hök; Christer Ovren, all of Västerås, Sweden

[73] Assignee: ASEA Aktiebolag, Västerås, Sweden

[21] Appl. No.: 480,671

[22] Filed: Mar. 31, 1983

[30] Foreign Application Priority Data

Apr. 1, 1982 [SE] Sweden ............................. 8202093

[51] Int. Cl.[4] .............................................. G01D 5/26
[52] U.S. Cl. ............................ 250/231 R; 250/231 P; 73/800
[58] Field of Search ............... 250/231 R, 231 P, 227, 250/226; 350/96.1, 96.24; 73/762, 763, 777, 800

[56] References Cited

U.S. PATENT DOCUMENTS

| | | | |
|---|---|---|---|
| 4,270,050 | 5/1981 | Brogardh | 250/231 R |
| 4,275,296 | 6/1981 | Adolfsson | 250/227 |
| 4,356,396 | 10/1982 | Ruell et al. | 250/227 |
| 4,376,890 | 3/1983 | Engström et al. | 250/231 R X |
| 4,451,730 | 5/1984 | Brogardh et al. | 250/227 |

*Primary Examiner*—Edward P. Westin
*Attorney, Agent, or Firm*—Watson, Cole, Grindle & Watson

[57] ABSTRACT

A fiber optical luminescence measuring system for measuring a change in a physical quantity employs a transmitter/receiver unit and a sensor unit for the physical quantity optically linked by at least one optical fiber. The sensor unit is arranged to emit luminescent light with at least two different decay time constants, where the quotient between the intensities of emitted luminescent light having the different decay times corresponds to a measure of the quantity to be measured.

25 Claims, 9 Drawing Figures

FIG. 2a
FIG. 2b
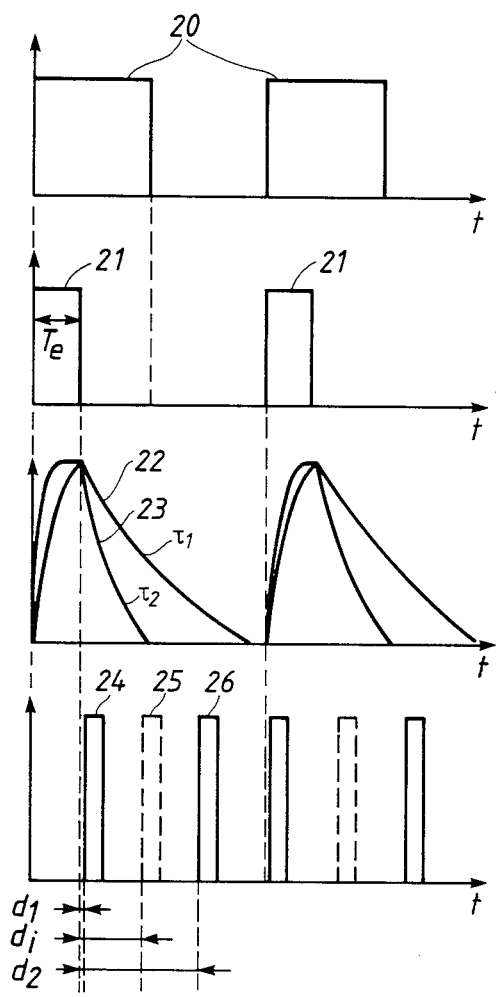
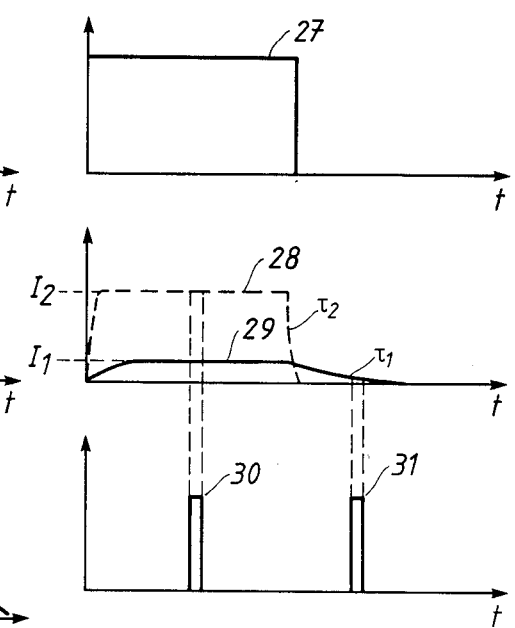

FIBER OPTICAL LUMINESCENCE MEASURING SYSTEM FOR MEASURING PHYSICAL QUANTITIES WITH TIME- OR FREQUENCY-DIVIDED SIGNAL INFORMATION

BACKGROUND OF THE INVENTION

The present invention relates to a fiber optical luminescence measuring system for measuring physical quantities, such as force, pressure, level, flow, acceleration, deformation, magnetic and electric field strength, temperature, and so on, comprising a transmitter/receiver unit and a sensor unit which are interconnected by at least one optical fiber.

Fiber optical luminescence measuring systems provide a unique possibility of two way communication via one or more optical fiber(s) between a measuring point where the sensor unit is located, and a remote monitoring location where the transmitter/receiver unit is positioned. Most known measuring systems utilize wavelength division of the signal information fed along the fiber(s), and this wavelength division is achieved by the use of optical filters or tailored opto-components, either on the transmitter side (light emitting or laser diodes) or on the receiver side (photo-diodes). The price and performance of the measuring system is therefore dependent on the precision of manufacture and quality of these components.

DISCUSSION OF PRIOR ART

Previously described luminescence measuring systems have preferably utilized wavelength division of the signal information, which leads to a complicated mechanical/optical construction of the transmitter/receiver unit, or to opto-components having to be tailored for different applications. Utilizing time- or frequency-division of the signal information means that the demands for accuracy are transferred from optical to electronic components.

The present invention employs time-divided and frequency-divided signal information, whereby the demands for accuracy are transferred to electronic standard components which are mass produced and thus available at a low unit price.

The arrangement is made possible because of the existence of luminiscence material with highly reproducible and stable properties.

SUMMARY OF THE INVENTION

According to the invention there is provided a fibre optical luminescence measuring system for sensing a change in a physical quantity, comprising an electro-optical transmitter/receiver unit having source means for exciting light and receiving means for luminescent light, a sensor unit including luminescence means to generate luminescent light when illuminated by the exciting light and means to modify the luminescent light output on a change in the physical quantity, and at least one optical fiber means optically linking the units, the measuring system being characterized in that the luminescence means in the sensor unit is arranged to give off luminescent light having at least two different decay time constants and in that the receiving means includes quotient-forming means to drive the quotient of the received intensities of the luminescent light of the different decay time constants to provide a measure of the change in quantity to be sensed. The property that is made use of in this invention is the so-called optical decay time constant of the luminescent light from the sensor material. If the material is excited with a pulse of exciting light, when the exciting light is extinguished the luminescent light decays according to the following formula $$I(t) = I_0 e^{-\frac{t}{\tau}} \tag{1}$$

where I(t) is the intensity at time t, $\tau$ is the optical decay time constant of the material and $I_0$ is the intensity of luminescent light immediately after the exciting light is extinguished. Often a perfect exponential relationship is not obtained, and the performance of the material has to be represented by means of several time constants $\tau_i$ according to the following formula $$I(t) = \sum_{i=1}^{n} I_i e^{-\frac{t}{\tau_i}} \tag{2}$$

Examples of combinations of materials having the above-mentioned properties are ions of rare earth metals, for example neodymium (Nd), included as a solid solution in a bonding material, for example glass or other transparent amorphous materials of different compositions or crystalline substances, such as yttrium-aluminium-garnet (YAG). The decay time constant values can be changed by the choice of metallic ions and/or of the carrier material. Thornton et al (Appl. Opt. 8 (1969) 1087–1102) have published measured values of a plurality of material combinations. Nd:YAG gives $\tau = 240$ µs, whereas Nd in various qualities of glass may give time constants of between 50 and 700 µs. The values are remarkably temperature stable, with temperature coefficients in the range 200–500 ppm/°C. over the temperature range 0°–200° C.

The order of magnitude of the time constant values is suitable from the point of view of signal detection, since the effects of transit time in the fibre, even with decay times as low as one or a few µs, do not have to be allowed for.

The efficiency of the luminescence, according to Thornton et al, is 60–90% for Nd ions in glass and YAG at excitation wavelengths around 750 mm with a temperature dependence of less than 500 ppm/°C. in the temperature range 0°–200° C.

The field of application of these known luminescent materials has so far been as the optically active agent in high power lasers. The materials are commercially available from a number of different glass manufacturers and can be formed and worked by techniques commonly used in the glass industry.

Another class of materials which can be used in the sensor unit of a system according to this invention are semiconductors whose luminescence emanates from the band-to band recomination of charge carriers or from generation and recombination processes by way of impurity centers, for example those originating from the presence of dopants. One example of such materials which are suitable is GaAs having Ge as the dopant, which with dopant concentrations of from $10^{16}$ to $10^{18}$ atoms per $cm^3$ may give a modulation of the time constant of the luminescence of from 1 µs to about 10 µs. Longer time constants can be achieved in semiconductor materials with an indirect band gap, the luminescence then emanating entirely from impurity centers.

It is, of course, also possible to combine materials from the two above-mentioned classes in a plurality of ways.

BRIEF DESCRIPTION OF THE DRAWINGS

The invention will now be further described, by way of example with reference to the accompanying drawings, in which:

FIGS. 2a and 2b show graphically the temporal conditions existing in the system of FIG. 1.

DESCRIPTION OF PREFERRED EMBODIMENT

Figure 1:
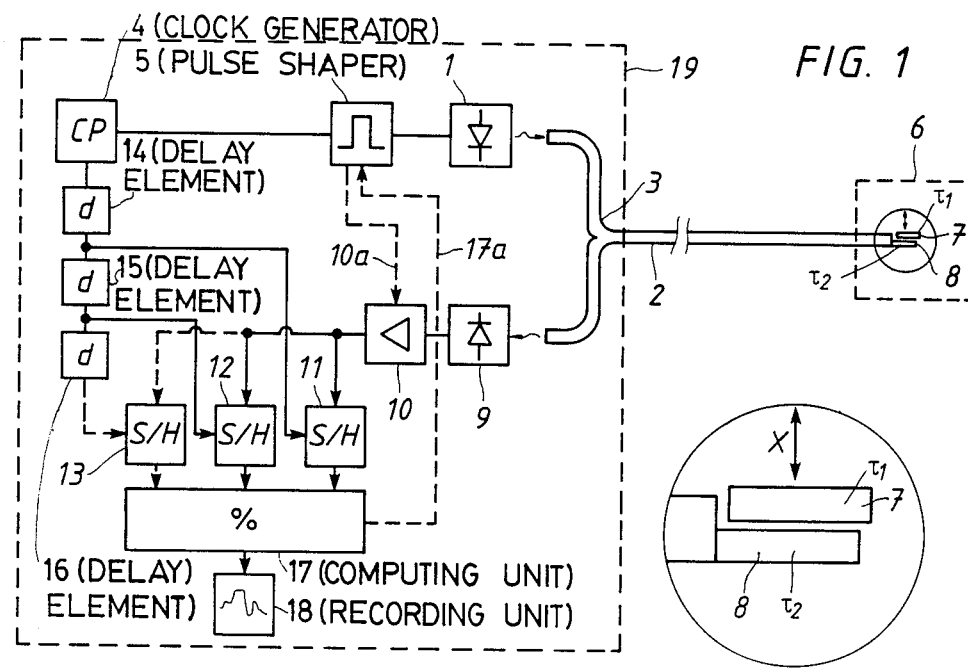
FIG. 1 shows an embodiment of a luminescence measuring system according to the invention.
Figure 1A:
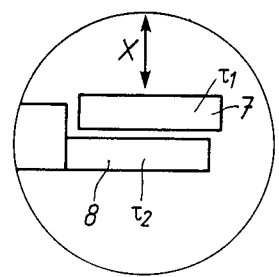
FIG. 1A shows the sensor unit of FIG. 1 on an enlarged scale.

The mode of operation of the measuring system is best illustrated in FIGS. 1 and 1A. A light-emitting diode (LED) 1 sends incident light into an optical fiber 2 via a branch 3. The incident light is pulsed by means of a clock generator 4 and a pulse shaper 5 acting upon the electrical energizing signals fed to the LED 1. At the distal end of the fiber 2 there is a sensor unit 6 comprising a mass of luminescent material with at least two different optical decay time constants $\tau_1$ and $\tau_2$. In the embodiment shown (see FIG. 1A), the two masses of materials with their respective time constants are physically separated. The mass 8 of material with the time constant $\tau_2$ is fixedly connected to the fiber end, whereas the mass 7 of material with the time constant $\tau_1$ is movable in the directions of the arrows X and has a position which is determined by the variable physical quantity to be measured. This variable may be the position of another body, a force, an acceleration, a hydrostatic pressure, a fluid level or a flow, to quote just a few examples. Any parameter which can be made to influence the position of one mass relative to the other can be sensed by the system shown in FIG. 1. Due to a change in the relative positions of the masses 7 and 8, the excitation falling upon the mass 7 is varied, which in turn results in a change in the intensity of the luminescent light having the time constant $\tau_1$ which is emitted by the sensor 6.

Light emitted by the sensor 6 is fed back along the fiber 2 to a photo-diode 9. In the photo-diode 9, the optical signal is transformed into an electric voltage which is fed to a detector amplifier 10. Where necessary, the amplifier 10 may be blocked throughout the duration of each excitation pulse by a control signal fed to a control line 10a from the pulse shaper 5. Alternatively, reflected incident light is prevented from reaching the photo-diode 9 by an optical fiber (not shown) but located between the fiber 2 and the photo-diode 9. Optical interference filters of the band pass type for the luminescence wavelength of the Nd ion (1.06 μm) are available on a commercial scale anc can thus be used for this purpose.

The output signal from the detector amplifier 10 is time-divided into a number of sample-and-hold circuits (S/H) 11, 12, 13, which are synchronously controlled from the clock pulse generator 4 via time delay elements 14, 15, 16. The output signal time-divided in this way is supplied to a computing unit 17, from which a signal, representing the quantity being measured by the sensor 6, is extracted and displayed in a recording unit 18.

MODE OF OPERATION

FIGS. 2a and 2b show time graphs which serve to illustrate the mode of operation of the measuring system described. The first graphs in FIG. 2a shows the output signal 20 from the clock pulse generator 4. The output signal 21 of the pulse shaper 5 is shown in the second graph in FIG. 2a and may either have a fixed pulse length $T_e$ or be controlled by the computing unit 17 (e.g., via the line 17a in FIG. 1) to provide optimum excitation. The curves 22 and 23 shown in the third graph in FIG. 2a indicate the time decay of the luminescent light from the masses 7 and 8 with the time constants $\tau_1$ and $\tau_2$, respectively. The pulses 24, 25, 26 shown in the last graph in FIG. 2a indicate the three time windows during which the output signal from the amplifier 10 is fed into the S/H circuits 11, 12 and 13. The pulse 24, which commences after the shortest delay time $d_1$ following the end of the excitation pulse 21, will permit substantially the maximum intensity of luminescent light to be detected irrespective of the time constant value of the light, that is, $$I(d_1) \approx I(0) \approx I_1 e^{-\frac{0}{\tau_1}} + I_2 e^{-\frac{0}{\tau_2}} = I_1 + I_2$$

Where $I_1$ is the peak intensity of the luminescent light of time constant $\tau_1$, $I_2$ is the peak intensity of luminescent light of time constant $\tau_2$, I(O) is the sum of the initial peak intensities at time zero and $I(d_1)$ is the total intensity sensed in the first time window after the delay time $d_1$.

In the situation where $\tau_1 > > \tau_2$, detection in a second time window after a delay $d_2$ where $d_2 > > \tau_2$ (e.g., the window 26 in the lower graph in FIG. 2a) will detect an intensity of luminescent light which contains a negligible contribution from the faster decaying light and then $$I(d_2) = I_1 e^{-\frac{d_2}{\tau_1}}$$

If $\tau_1$ and $d_2$ are known, $I_1$ can be computed and thereby also the information-carrying quotient $I_1/I_2$.

In the above-described case where the mixed luminescent light includes light of just two simple, well separated decay time constants $\tau_1$ and $\tau_2$, the computing unit 17 therefore becomes a relatively simple device and may even be designed with analog circuits.

In a more complicated case a multiexponential sequence involving a complex equation based on a number of equations according to the equation (2) given above must be solved and further measuring points must be added to the time chart (e.g., by adding information taken during the pulse 25 at the intermediate delay time $d_i$). In this more general case, the computing unit 17 must solve an equation containing a larger number of unknown quantities, determined by the number of superposed exponential sequences. The complexity of this equation determines the number of necessary measuring points, or "windows", in the time chart. If the number of measuring points used to sample the decay process exceeds the number of time constants, the equation becomes over-determined. This can be made use of for supplying other information; for example, if at least one time constant is temperature dependent, a computation of its value may give a simultaneous temperature measurement.

FIG. 2b shows three time graphs relating to a configuration of sensor unit 6, in which the intensity $I_2$ of luminescent light (curve 28) from the stationary mass is dependent on the mass 8 with the decay time constant $\tau_2$, which is considerably shorter than $\tau_1$, whereas the intensity $I_1$ of luminescent light from the mass 7 with the time constant $\tau_1$ is much weaker (curve 29).

The first graph in FIG. 2b shows the long pulse 27 of excitation light which causes the luminescence shown in the second graph of FIG. 2b. In a first sampling "window" 30 both types of luminescent light are at constant intensity whereas in the second sampling "window" 31 only light with the longer time constant $\tau_1$, will be detected. From the sensed intensities in the two "windows" 30 and 31, the separate intensities can be deduced.

An alternative embodiment of the detector system is obtained by carrying out the analysis in the frequency plane, for example in a manner analogous to that carried out with the device disclosed in U.S. Pat. No. 4,493,995, the contents of which are herein incorporated by reference.

DESCRIPTION OF PREFERRED SENSOR UNITS

Figure 3:
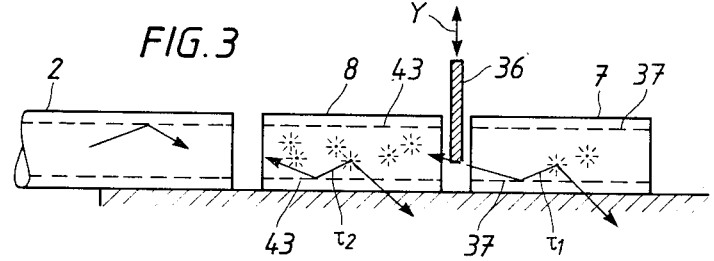
FIG. 3 shows one embodiment of sensor unit in which the sensor materials have been arranged to record changes in position.

FIG. 3 shows an embodiment of a position transducer, in which the two different masses 7 and 8 of luminescent materials are disposed one after the other along the direction of propagation of the light (the main direction of the fiber 2). The material of the mass 8 (with the optical decay time constant $\tau_2$) is shaped as a wave conductor with totally internally-reflecting intermediate surfaces 43. The absorption of incident light by the mass 8 is chosen so that subsequent excitation of the mass 7 with the time constant $\tau_1$ also occurs. Modulation of the supply of excitation light to and of luminescent light from the mass 7 is, in this case, controlled by a movable screen 36, the movement of which, in the direction of the arrows Y, is a measure of the quantity to be measured. The material in the mass 7 can advantageously also be shaped as a wave conductor with totally internally-reflecting intermediate surfaces 37. The screen 36 can be in the form of a selectively absorbing material, or in the form of a suitably located light-reflecting material.

Figure 4:
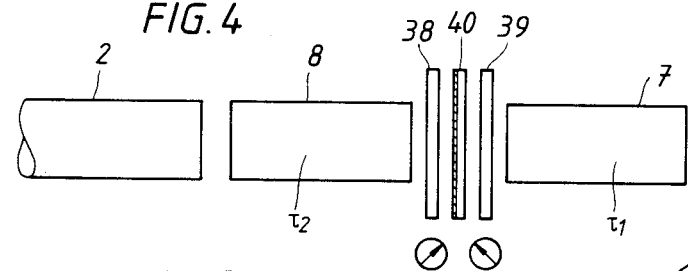
FIG. 4 shows an embodiment of sensor unit for measuring a magnetic field and FIGS. 5, 5A and 5B show a further embodiment of sensor unit for a position transducer, FIGS. 5A and 5B showing views along line A—A of FIG. 5 under different operating conditions.

FIG. 4 shows a sensor which is capable of measuring magnetic field strength and which is constructed without any movable parts. In addition to the masses 7 and 8 of luminescent materials, the sensor unit includes two polarizing plates 38 and 39, disposed so that there is a 90° angle between the polarization planes of the two plates. A magnetic field strength-sensing material 40 is disposed between the two plates 38, 39, the polarization rotating properties of this material 40 being influenced by the magnetic field in which it is located. The material 40 may be of domain type, for example yttrium-iron-garnet.

For measuring an electrical field or a mechanical deformation, the magnetic field strength sensitive material 40 may be replaced by electro-optically or elasto-optically sensitive materials. Since the magneto-optical, electro-optical and elasto-optical effects of these materials are often temperature-dependent, it may be necessary to measure the temperature of the material 40 but this can be done in a simple manner by choosing a luminescent material for one of the masses 7 or 8 which has a known temperature-dependent time constant and measuring this in the computing unit 17.

Figure 5:
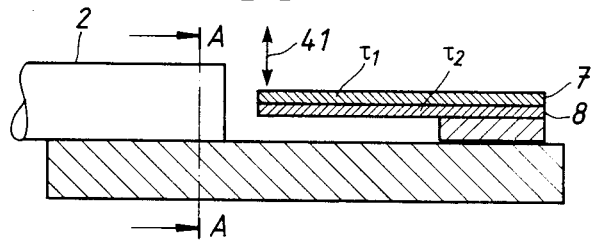
Figure 5A:
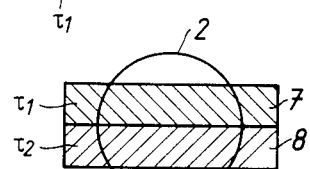
Figure 5B:

FIG. 5 shows a position transducer, in which the masses 7 and 8 of luminescent materials are fused into a simple beam structure which is movable in directions transverse to the elongated direction of the fiber 2 by an elastic bending of the beam upon the application of a force 41. In this case, the intensities of luminescent light from the materials of both the masses 7 and 8 are modulated by the optical time constants $\tau_1$ and $\tau_2$, respectively. This is illustrated by the sections on the line A-A shown in FIGS. 5A and 5B. Upon deflection of the beam, from the position shown in FIG. 5A to the position shown in FIG. 5B, the area of the mass 7 able to feed luminescent light into the end of the fiber 2 increases, whereas the area of the mass 8 able to feed luminescent light into the fiber end decreases. This results in a change of the intensity quotient between the two luminescent light contributions.

The particular measuring systems described above can be varied in many ways within the scope of the following claims.

What is claimed is:

1. Fiber optical luminescence measuring system for sensing a change in a physical quantity, comprising
   an electro-optical transmitter/receiver unit having light source means for emitting exciting light and receiving means for receiving luminescent light,
   a sensor unit including luminescence means to generate said luminescent light when illuminated by said exciting light and means to modify the luminescent light output on a change in said physical quantity, and
   at least one optical fiber means optically linking said units,
   wherein luminescence means in the sensor unit is arranged to give off the luminescent light with at least two different decay time constants, and
   wherein the receiving means includes quotient-forming means to derive the quotient of the received intensities of the luminescent light of the different decay time constants to provide a measure of the change in the quantity to be sensed.

2. A fiber optical measuring system according to claim 1, in which the luminescence means includes at least one solid body.

3. A fiber optical measuring system according to claim 2, in which the solid body contains metallic ions.

4. A fiber optical measuring system according to claim 3, in which the metallic ions are included as a solid solution in a bonding material.

5. A fiber optical measuring system according to claim 3, in which the metallic ions are of at least one rare earth metal.

6. A fiber optical measuring system according to claim 5, in which the metallic ions are neodymium ions.

7. A fiber optical measuring system according to claim 2, in which the solid body contains at least one luminescent semiconductor material.

8. A fiber optical measuring system according to claim 7, in which the luminescent semiconductor material is gallium arsenide.

9. A fiber optical measuring system according to claim 7, in which the semiconductor material contains germanium as dopant.

10. A fiber optical measuring system according to claim 4, in which the bonding material is substantially light transparent.

11. A fiber optical measuring system according to claim 4, in which said luminescence means includes at least two different metallic ions.

12. A fiber optical measuring system according to claim 4, in which said luminescence means includes at least two different bonding materials.

13. A fiber optical measuring system according to claim 1, in which said light source means is an electronic driver which emits exciting light of time-varying optical energy output.

14. A fiber optical measuring system according to claim 12, in which the optical energy of the exciting light emitted by said light source means is in discrete pulses.

15. A fiber optical measuring system according to claim 10, in which the optical energy of the exciting light emitted by said light source means follows a sine wave.

16. A fiber optical measuring system according to claim 1, in which the luminescent means has the shape of an optical wave conductor.

17. A fiber optical measuring system according to claim 14, in which means is provided to sense the intensity of the luminescent light received by the receiving means from the sensor unit at different times, counting from the time at which the exciting light has been extinguished.

18. A fiber optical measuring system according to claim 14, in which means is provided to sense the intensity of the luminescent light received by the receiving means during two different time intervals ($t_1$) and ($t_2$), whereby the signals $S_d(t_1)$ and $S_d(t_2)$ generated by the receiving means are processed to derive the expression $$\frac{S_d(t_2) \times C}{S_d(t_1) - S_d(t_2) \times C},$$

where C is a constant.

19. A fiber optical measuring system according to claim 14, in which the luminescent light emitted from the sensor unit $$(\sum_{i=1}^{n} I_i e^{-\frac{t}{\tau_i}},$$

$I_i$ and $\tau_i$ representing the multiple (i) intensities and the optical decay time constants of a luminescent material in the sensor unit) is measured at a number of points in time exceeding the number of time constants (n).

20. A fiber optical measuring system according to claim 1, wherein said luminescence means comprises two separated solid bodies which are capable of giving off luminescent light of different decay time constants.

21. A fiber optical measuring system according to claim 20, in which said sensor unit includes a screen movably positioned between said two solid bodies.

22. A fiber optical measuring system according to claim 21, in which said screen is made of an absorbing material.

23. A fiber optical measuring system according to claim 21, in which said screen is made of a light-reflecting material.

24. A fiber optical measuring system according to claim 20, in which said sensor unit includes two polarizing plates positioned between said two solid bodies.

25. A fiber optical measuring system according to claim 24, in which said sensor unit includes a magnetic field strength-sensing material positioned between said two polarizing plates.

* * * * *